United States Patent
Kansara

(10) Patent No.: US 10,560,506 B2
(45) Date of Patent: Feb. 11, 2020

(54) IDENTIFYING PREVIOUSLY STREAMED PORTIONS OF A MEDIA TITLE TO AVOID REPETITIVE PLAYBACK

(71) Applicant: NETFLIX Inc., Los Gatos, CA (US)

(72) Inventor: Apurvakumar Dilipkumar Kansara, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 135 days.

(21) Appl. No.: 15/654,657

(22) Filed: Jul. 19, 2017

(65) Prior Publication Data
US 2019/0028525 A1    Jan. 24, 2019

(51) Int. Cl.
*H04L 29/06* (2006.01)
*G06F 3/0484* (2013.01)

(52) U.S. Cl.
CPC ............ *H04L 65/60* (2013.01); *G06F 3/0484* (2013.01); *H04L 65/4069* (2013.01); *H04L 65/4084* (2013.01); *H04L 65/605* (2013.01); *H04L 65/607* (2013.01)

(58) Field of Classification Search
None
See application file for complete search history.

(56) References Cited

U.S. PATENT DOCUMENTS

| 9,558,407 | B1 | 1/2017 | McSorley |
| 9,668,020 | B2 * | 5/2017 | Nelson ............ H04N 21/44213 |
| 2006/0271947 | A1 | 11/2006 | Lienhart et al. |
| 2016/0342844 | A1 * | 11/2016 | Kansara ............ G06K 9/00744 |

FOREIGN PATENT DOCUMENTS

WO    2005/041455 A1    5/2005

OTHER PUBLICATIONS

International Search Report for application No. PCT/US2018/041494 dated Sep. 14, 2018.

* cited by examiner

*Primary Examiner* — Cai Y Chen
(74) *Attorney, Agent, or Firm* — Artegis Law Group, LLP

(57) ABSTRACT

A sequence analyzer compares different episodes of an episodic serial to identify portions of a current episode of the serial that have already been played back to a user. Those portions may include introductory material such as credits, or a recap section that includes content from previous episodes. The sequence analyzer parses previous episodes of the serial and selects a representative frame for each shot sequence. The sequence analyzer then generates a fingerprint for each shot sequence based on the associated representative frame. The sequence analyzer compares fingerprints associated with a current episode of the serial to fingerprints associated with one or more previous episodes of the serial to identify shot sequences that have already been played. The user may then skip those repeated sequences via a playback interface.

20 Claims, 13 Drawing Sheets

IDENTIFYING PREVIOUSLY STREAMED PORTIONS OF A MEDIA TITLE TO AVOID REPETITIVE PLAYBACK

BACKGROUND OF THE INVENTION

Field of the Invention

The present invention relates generally to video playback and, more specifically, to identifying previously streamed portions of a media title to avoid repetitive playback.

Description of the Related Art

A conventional streaming video service typically provides access to a wide variety of different types of media titles, including full-length movies, animated shorts, documentaries, and episodic serials, among others. Episodic serials oftentimes include an introductory sequence that is played at the beginning of each episode. Introductory sequences commonly depict primary characters in the serial, play a theme song associated with the serial, display credits indicating persons involved with production of the serial, and so forth. Episodic serials also sometimes include a recap sequence where content from one or more previous episodes is displayed in order to refresh the viewer's memory about past events in the serial and provide context for the current episode.

One problem with the above approach is that introductory and recap sequences can be fairly repetitive across the various episodes in the serial. Consequently, users of the video streaming service may be forced to watch repeatedly content that has been previously watched, causing those users to become bored or annoyed.

As the foregoing illustrates, what would be useful is a technique that allows users to skip content in an episode that has been previously played back to users.

SUMMARY OF THE INVENTION

One embodiment of the present invention sets forth a computer-implemented method, including generating a first set of fingerprints based on a first video sequence, where each fingerprint included in the first set of fingerprints identifies a different portion of the first video sequence, generating a second set of fingerprints based on a second video sequence, where each fingerprint included in the second set of fingerprints identifies a different portion of the second video sequence, comparing the first set of fingerprints to the second set of fingerprints to determine that a first portion of the first video sequence is substantially similar to a second portion of the second video sequence, and when playing back the second video sequence, causing the second video sequence to advance past the second portion.

At least one advantage of the disclosed techniques is that users are not required to re-watch portions of episodic serials.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
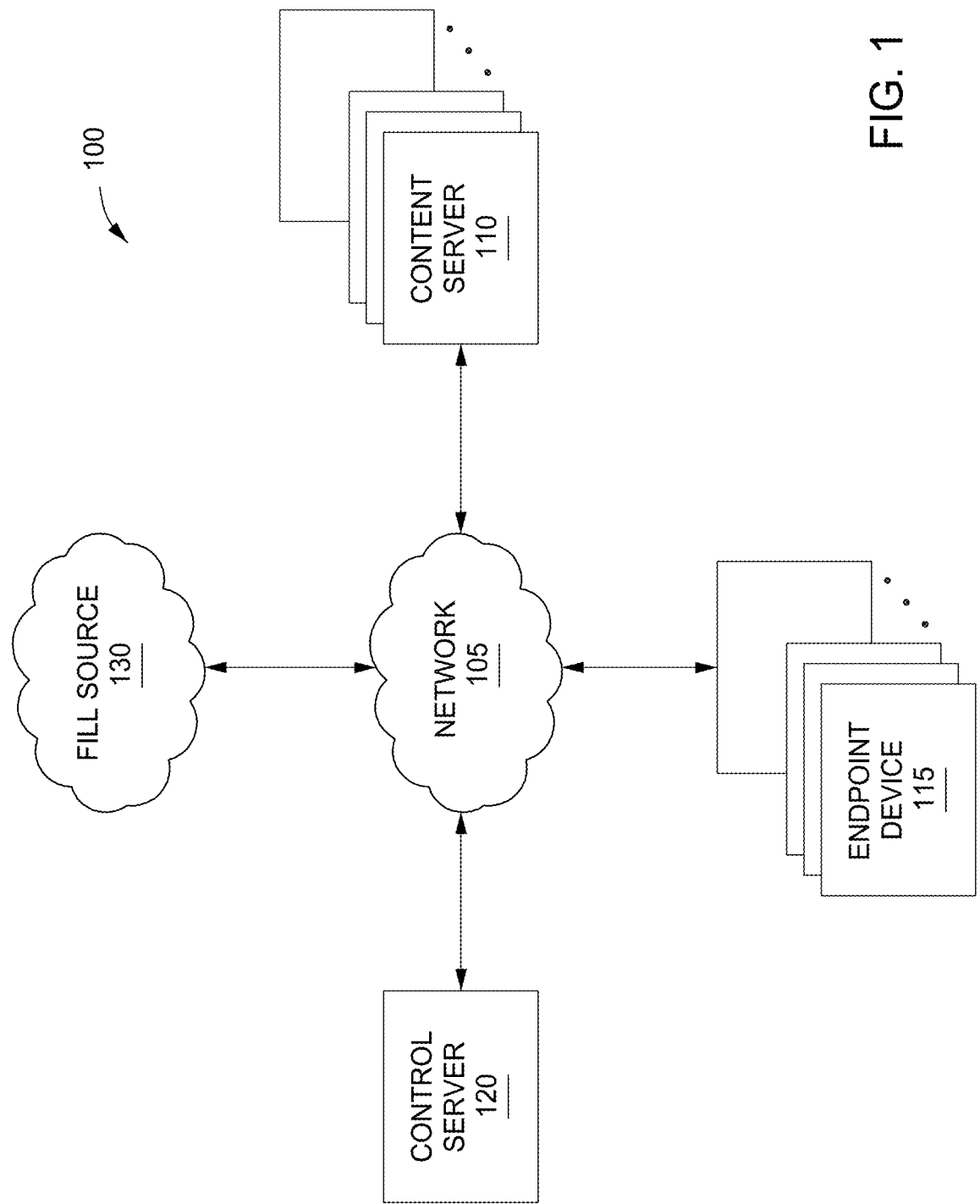
FIG. 1 illustrates a network infrastructure used to distribute content from content servers to endpoint devices, according to various embodiments of the present invention.

FIG. 1 illustrates a network infrastructure 100 used to distribute content from content servers 110 to endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download and/or stream content associated with media titles. In the context of this disclosure, a "media title" generally includes one or more sequences of video data and associated audio data that can be played back to a user. For example, a media title could be a full-length movie, an episodic serial consisting of multiple episodes, an animated short, a documentary, and so forth. The downloadable content associated with a media title, also referred to herein as a "file," is presented to the user via one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, including video content and/or audio content associated with media titles, to a user.

Each content server 110 may include a web-server, database, and a server application configured to communicate with the control server 120 to determine the location and availability of various files that are tracked and managed by the control server 120. Each content server 110 may further communicate with cloud services 130 and one or more other content servers 110 in order populate each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
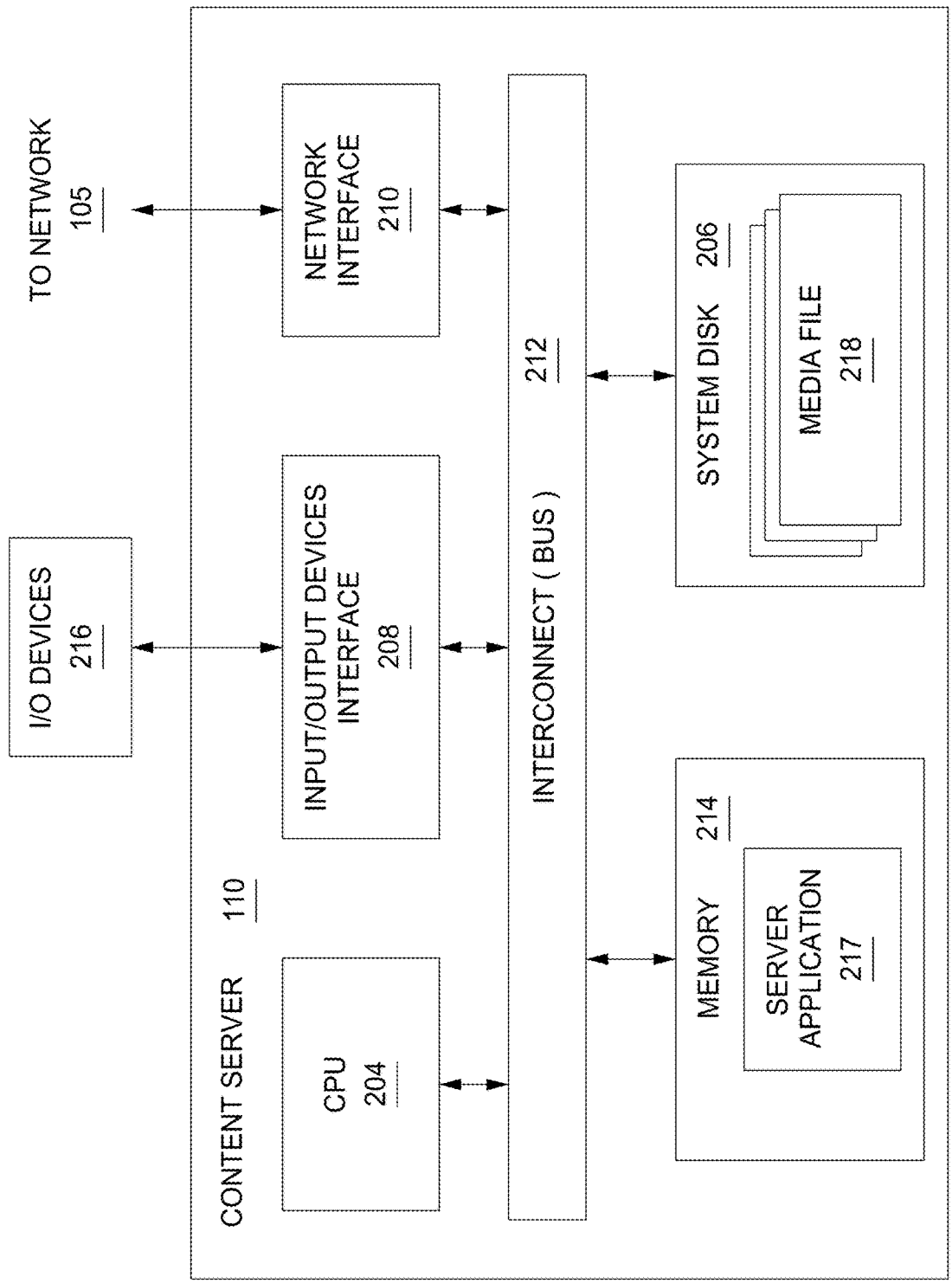
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

Server application 217 included in system memory 214 is configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Figure 3:
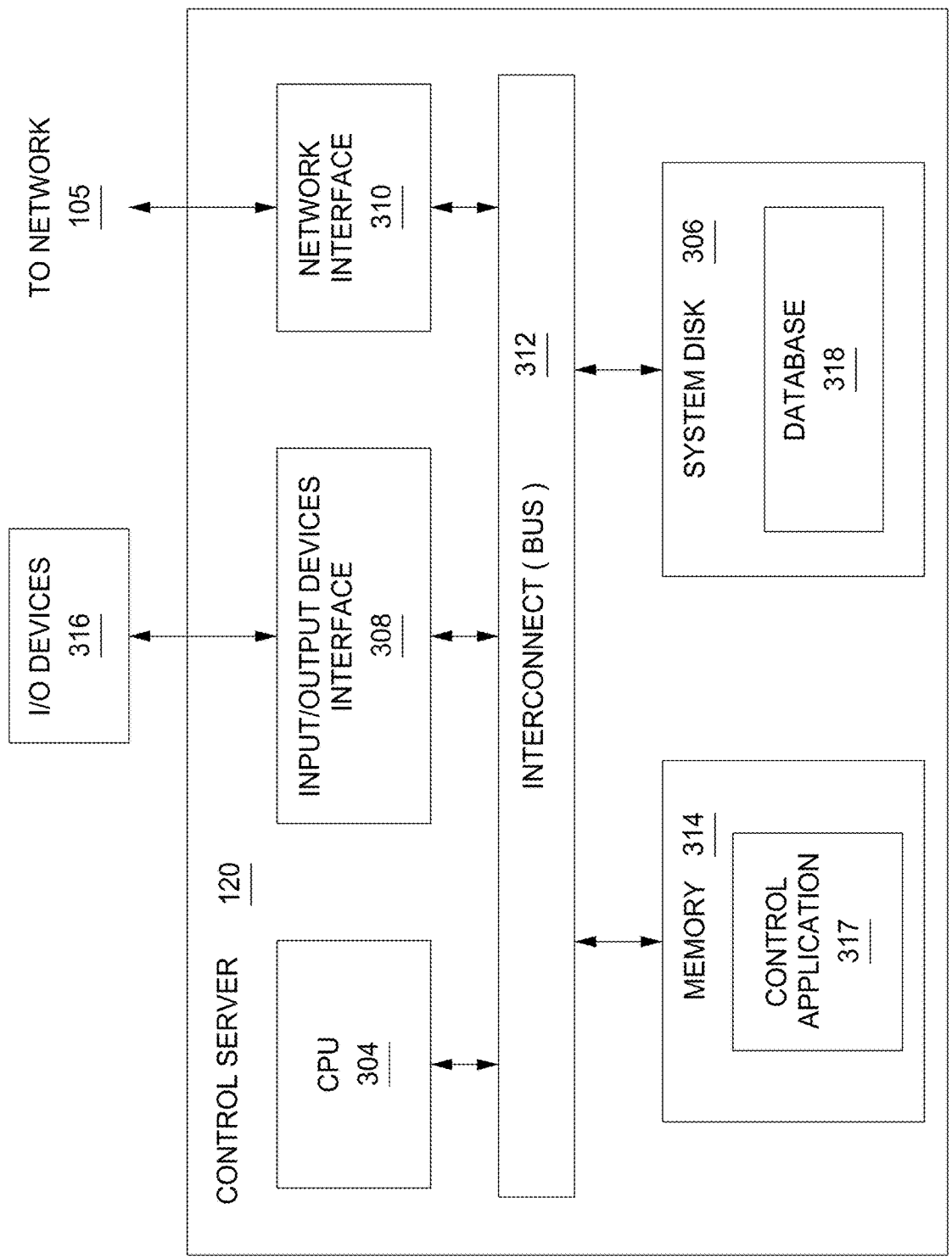
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115. As noted above, in some embodiments, localized promotional images associated with digital visual content items may be stored in database 318 rather than in files 218 stored in content servers 110.

Figure 4:
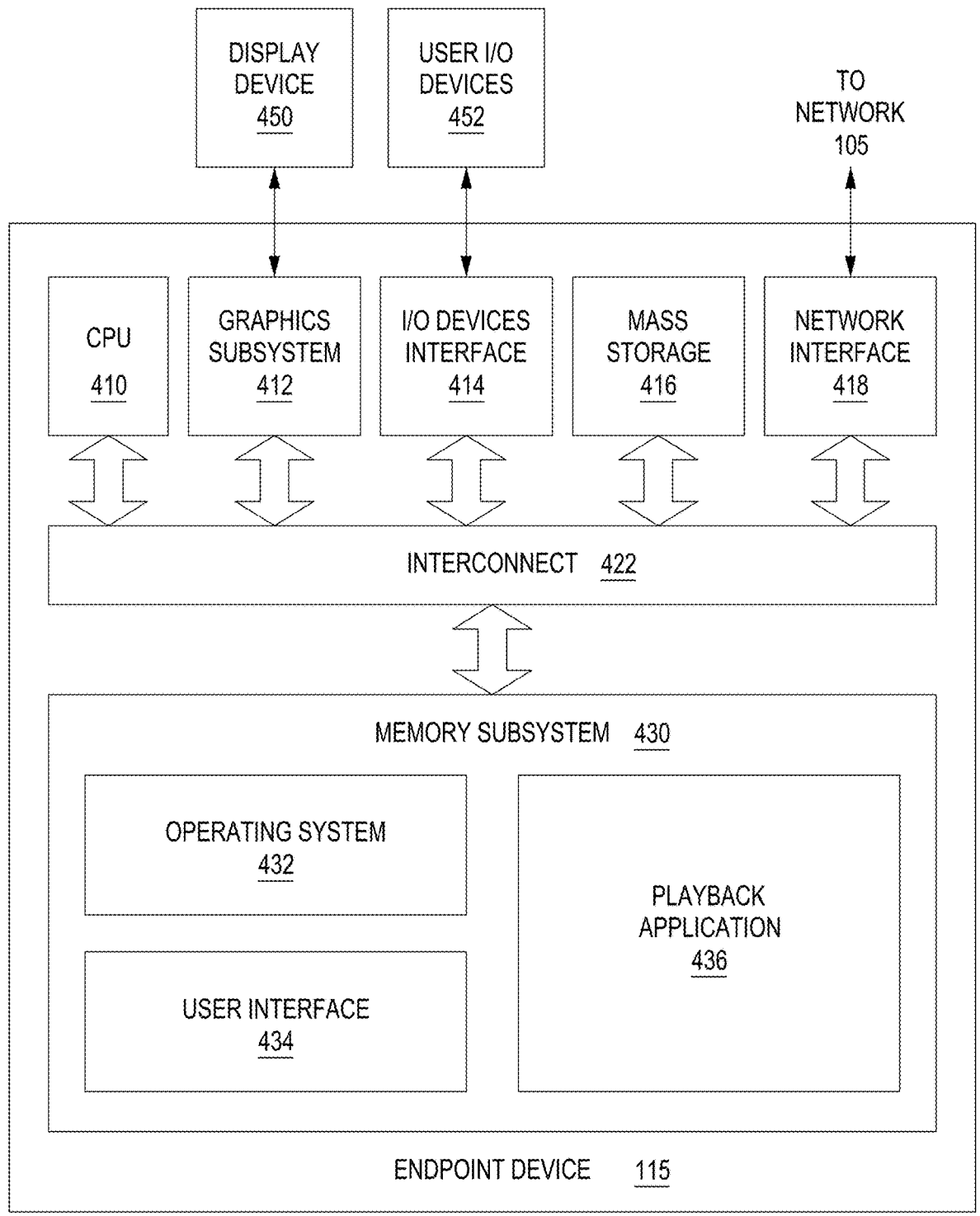
FIG. 4 is a block diagram of an endpoint device that may be implemented in conjunction with the network infrastructure of FIG. 1, according to various embodiments of the present invention.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request content from the content server 105 via the network interface 418. The playback application 436 may stream the content into a local buffer. The playback application 436 may then interpret the content and present the content to a user via a display device 450 and/or user I/O devices 452. In doing so, playback application 436 generates a playback interface that outputs the content as well as one or more graphical user interface (GUI) elements allowing the user to navigate the content. Content may be preprocessed via a dedicated computing device or virtualized instance of a computing device, a described in greater detail below in conjunction with FIG. 5.

Figure 5:
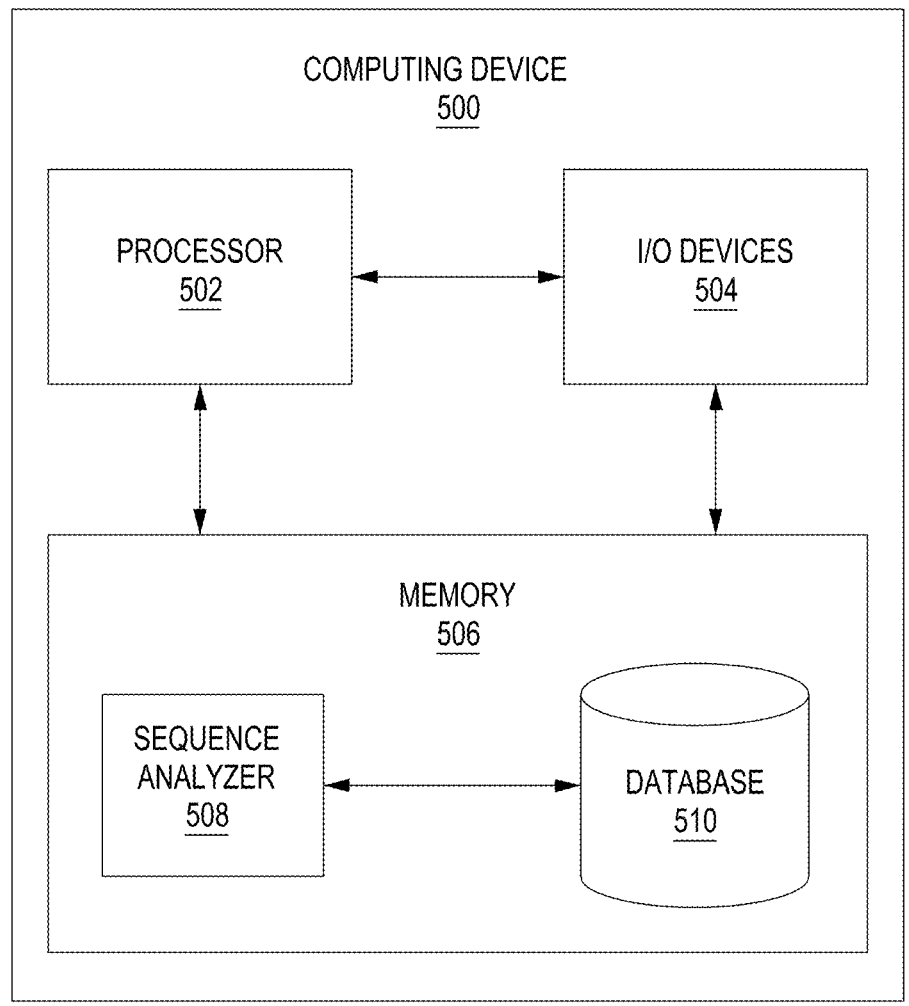
FIG. 5 is a block diagram of a computing device configured to identify previously streamed portions of a media title, according to various embodiments of the present invention.

FIG. 5 is a block diagram of a computing device 500 configured to identify previously streamed portions of a media title, according to various embodiments of the present invention. Computing device 500 is a virtualized instance of a computer that may be instantiated by content server 110 and/or control server 120 to perform various computing tasks on an on-demand basis, including, for example, analyzing video data.

As shown, computing device 500 includes a processor 502, input/output (I/O) devices 504, and a memory 506 coupled together. Processor 502 may be any technically feasible form of processing device configured to process data and execute program code. Processor 502 could be, for example, a central processing unit (CPU), a graphics processing unit (GPU), an application-specific integrated circuit (ASIC), a field-programmable gate array (FPGA), any technically feasible combination of such units, and so forth.

I/O devices 504 may include devices configured to receive input, including, for example, a keyboard, a mouse, and so forth. I/O devices 504 may also include devices configured to provide output, including, for example, a display device, a speaker, and so forth. I/O devices 504 may further include devices configured to both receive and d input and output, respectively, including, for example, a touchscreen, a universal serial bus (USB) port, and so forth.

Memory 506 may include any technically feasible storage medium configured to store data and software applications. Memory 506 could be, for example, a hard disk, a random access memory (RAM) module, a read-only memory (ROM), and so forth. Memory 506 includes a sequence analyzer 508 and a database 510 configured for local storage of video sequences and other content related to media titles. Sequence analyzer 508 is a software application that, when executed by processor 502, processes one or more video sequences associated with a media title to identify portions of those sequences that have already been displayed to the user. Each such sequence generally corresponds to an episode of an episodic serial provided by content servers 110. The already-displayed portions of those sequences may include an introductory sequence and/or a recap sequence. Sequence analyzer 508 provides playback application 436 with metadata which allows playback application 436 to skip those portions when outputting a given video sequence to the user. Sequence analyzer 508 is discussed in detail below in conjunction with FIGS. 6-12.

Identifying Previously Streamed Video Sequences

Figure 6:
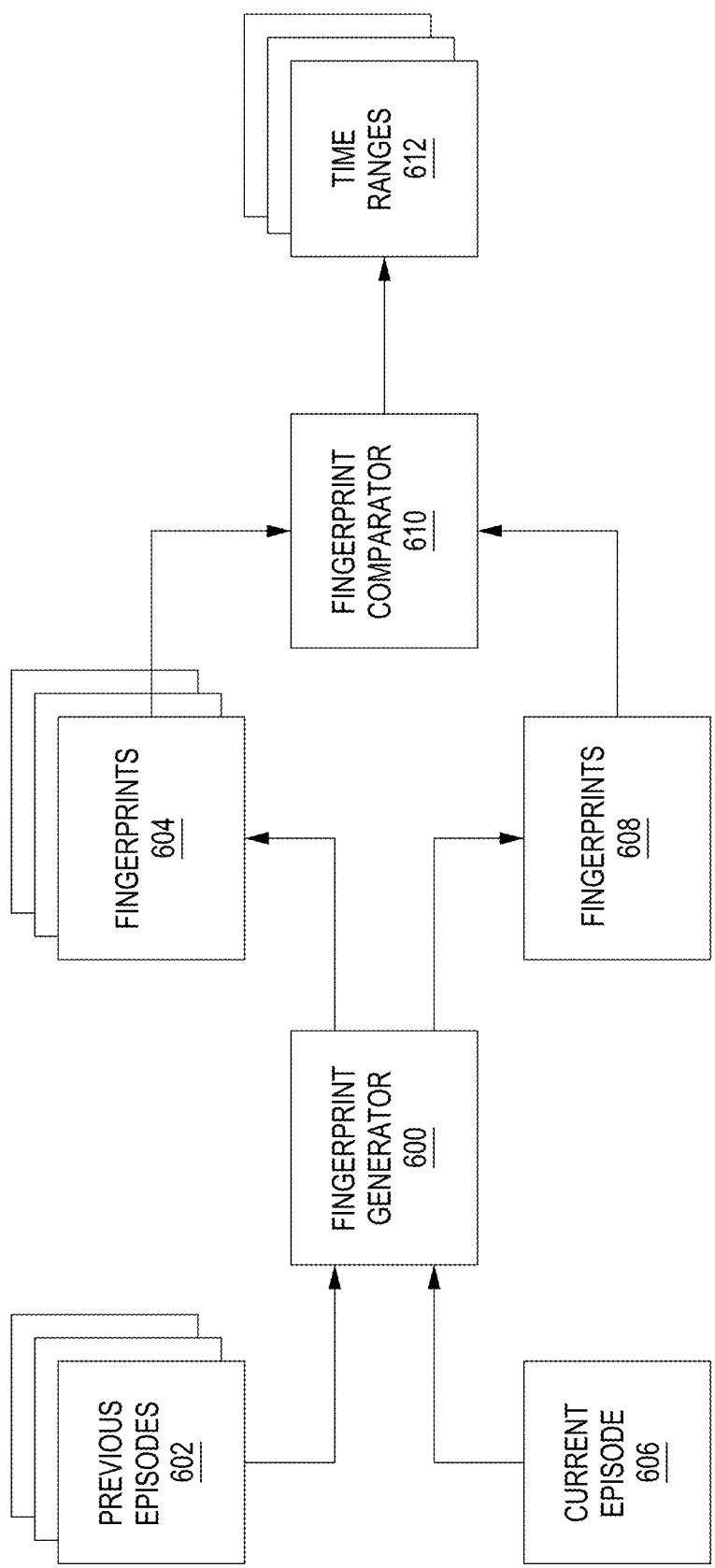
FIG. 6 illustrates data and processing stages implemented by the sequence analyzer of FIG. 5 during operation, according to various embodiments of the present invention.

FIG. 6 illustrates data and processing stages implemented by the sequence analyzer of FIG. 5 during operation, according to various embodiments of the present invention. As shown, sequence analyzer 508 includes a fingerprint generator 600 and a fingerprint comparator 610. Fingerprint generator 600 is configured to receive and process previous episodes 602 and current episode 606. Previous episodes 602 and current episode 606 include one or more individual episodes of a given episodic serial provided by content servers 110. Previous episodes 602 generally occur before current episode 606 in the sequence of episodes associated with the episodic serial. For example, previous episodes 602 could include season 1, episodes 1-9 of a given media title, while current episode 606 includes season 1, episode 10 of the media title. In one embodiment, previous episodes 602 include only the specific episodes that have already been played back to the user. In another embodiment, current episode 606 is the most recently released episode of the serial.

In operation, fingerprint generator 600 receives previous episodes 602 and generates a different set of fingerprints 604 for each different previous episode. Fingerprint generator 600 also receives current episode 606 and generates fingerprints 608 based on that episode. For a given episode (previous or current), the corresponding set of fingerprints includes data that characterizes different portions of the episode. In one embodiment, fingerprint generator 600 generates fingerprints 608 based on only a fraction of the current episode where repeated content is expected to occur. The operation of fingerprint generator 600 is discussed in greater detail below in conjunction with FIGS. 9A-10 and 12.

Fingerprint comparator 610 compares each one of fingerprints 604 to each one of fingerprints 608 to identify portions of current episode 606 that are similar to portions of previous episodes 602, meaning that these portions have already been played back to the user. The identified portions may include an introductory sequence that is common across some or all episodes in the episodic serial or a recap sequence that replays specific portions of previous episodes 602, as described. Fingerprint comparator 610 then generates time ranges 612 to indicate specific ranges of time within current episode 606 where the identified portions of repeated content occur. The operation of fingerprint comparator 610 is discussed in greater detail below in conjunction with FIGS. 11-12. Based on time ranges 612, playback application 436 of FIG. 4 generates GUI elements that allow the user to skip over the repeated content, as described in greater detail below in conjunction with FIGS. 7-8.

Figure 7:
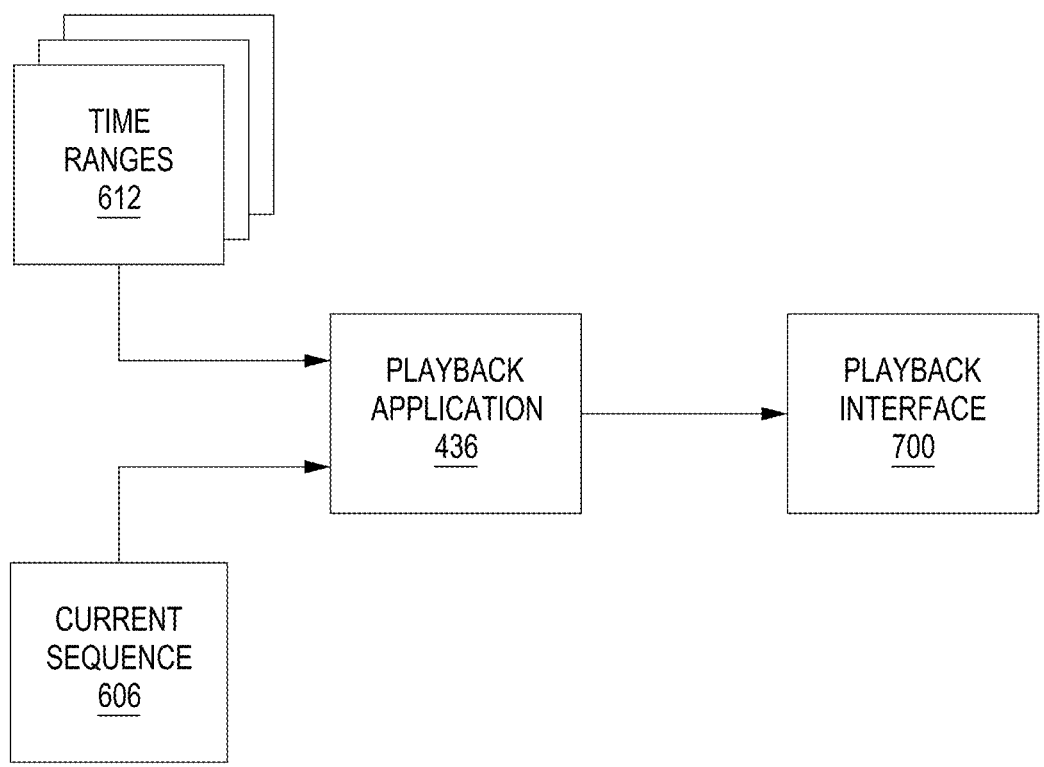
FIG. 7 illustrates how the playback application of FIG. 4 configures a playback interface, according to various embodiments of the present invention.

FIG. 7 illustrates how the playback application 436 of FIG. 4 generates a playback interface 700, according to various embodiments of the present invention. As shown, playback application 436 receives current episode 606 and time ranges 612. Based on these elements, playback application 436 generates playback interface 700 for rendering on display 450. Playback interface 700 displays video content associated with current episode 606. Playback interface 700 also includes GUI components that allow the user to skip repeated content associated with time ranges 612, as mentioned above and described in greater detail below in conjunction with FIG. 8.

Figure 8:
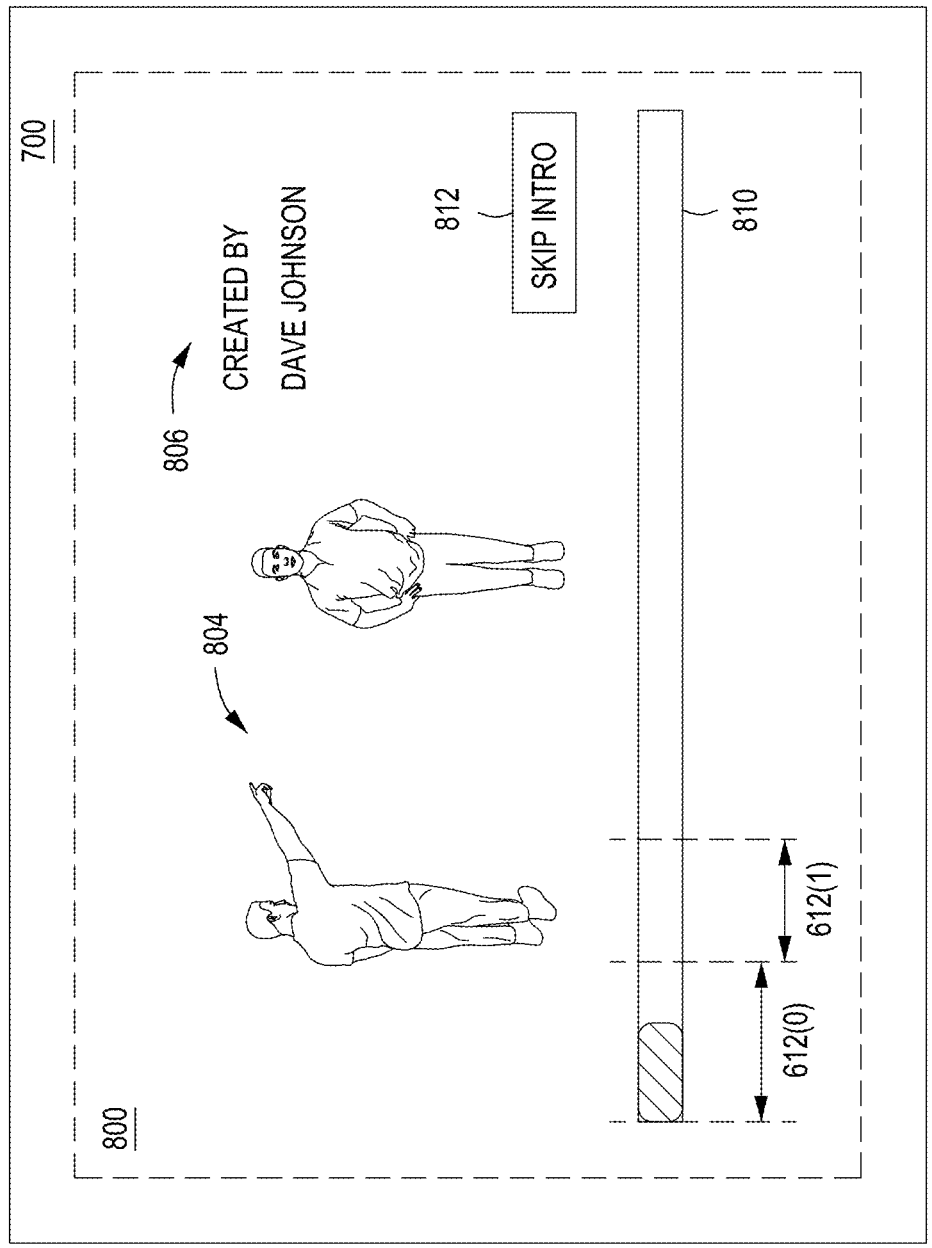
FIG. 8 is a more detailed illustration of the playback interface of FIG. 7, according to various embodiments of the present invention.

FIG. 8 is a more detailed illustration of the playback interface 700 of FIG. 7, according to various embodiments of the present invention. As shown, playback interface 700 includes a frame 800 of video. Frame 800 includes various content derived from current episode 606, including imagery 804 and credits 806 superimposed thereon. Frame 800 also includes various GUI elements generated by playback application 436 and superimposed onto frame 800, including time bar 810 and skip button 812.

Time bar 810 displays a current playback position within current episode 606. A user may navigate within current episode 606 by performing a scrubbing operation via time bar 810. Skip button 812 allows the user to skip portions of content associated with time ranges 612(0) and 612(1). In the example shown, time range 612(0) corresponds to an introductory sequence where credits 806 are displayed. Time range 612(1), on the other hand, could correspond to a recap section where portions of previous episodes 602 are displayed. When the user selects skip button 812, playback application 436 may advance playback of current episode 606 to the end of time range 612(0).

In one embodiment, skip button 812 may appear only when the playback position of current episode 606 falls within a time range 612 corresponding to previously displayed content. For example, skip button 812 could appear only when the playback position of current episode 606 falls within time range 612(0). Further, the copy shown on skip button 812 may change based on the specific type of content to be skipped. For example, in FIG. 8 skip button 812 reads "SKIP INTRO" to indicate that time range 612(0) corresponds to an introductory sequence that can be skipped by selecting skip button 812. Similarly, skip button 812 could read "SKIP RECAP" to indicate that time range 612(1) corresponds to a recap sequence that can be skipped by selecting skip button 812. Sequence analyzer 508 may distinguish introductory sequences from recap sequences based on the amount of text displayed on various frames of each sequence or the position of each sequence within current episode 606, among other techniques.

Exemplary Fingerprinting of Shot Sequences

Figure 9A:
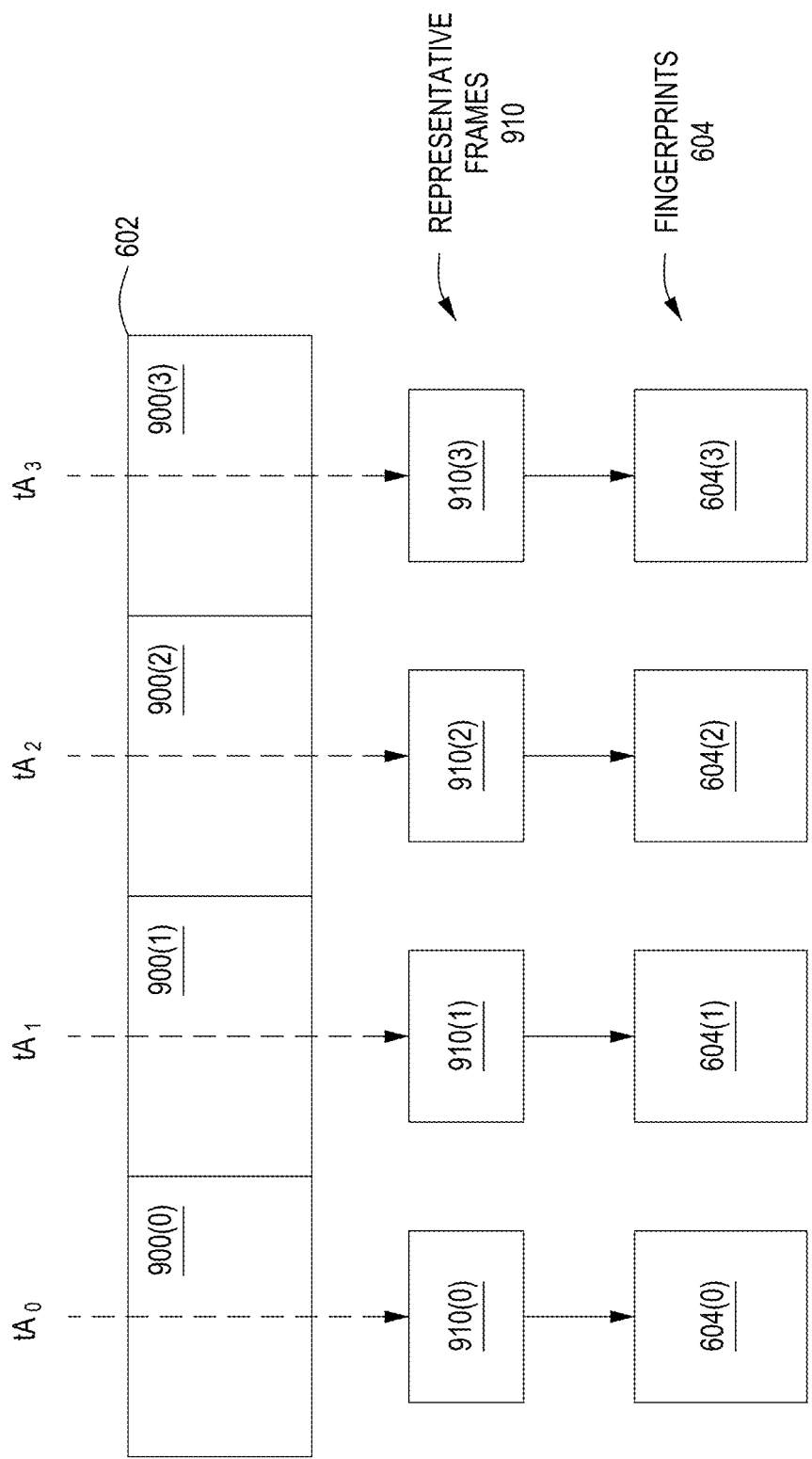
FIGS. 9A-9B illustrate how the fingerprint generator of FIG. 6 generates exemplary fingerprints based on shot sequences, according to various embodiments of the present invention.
Figure 9B:
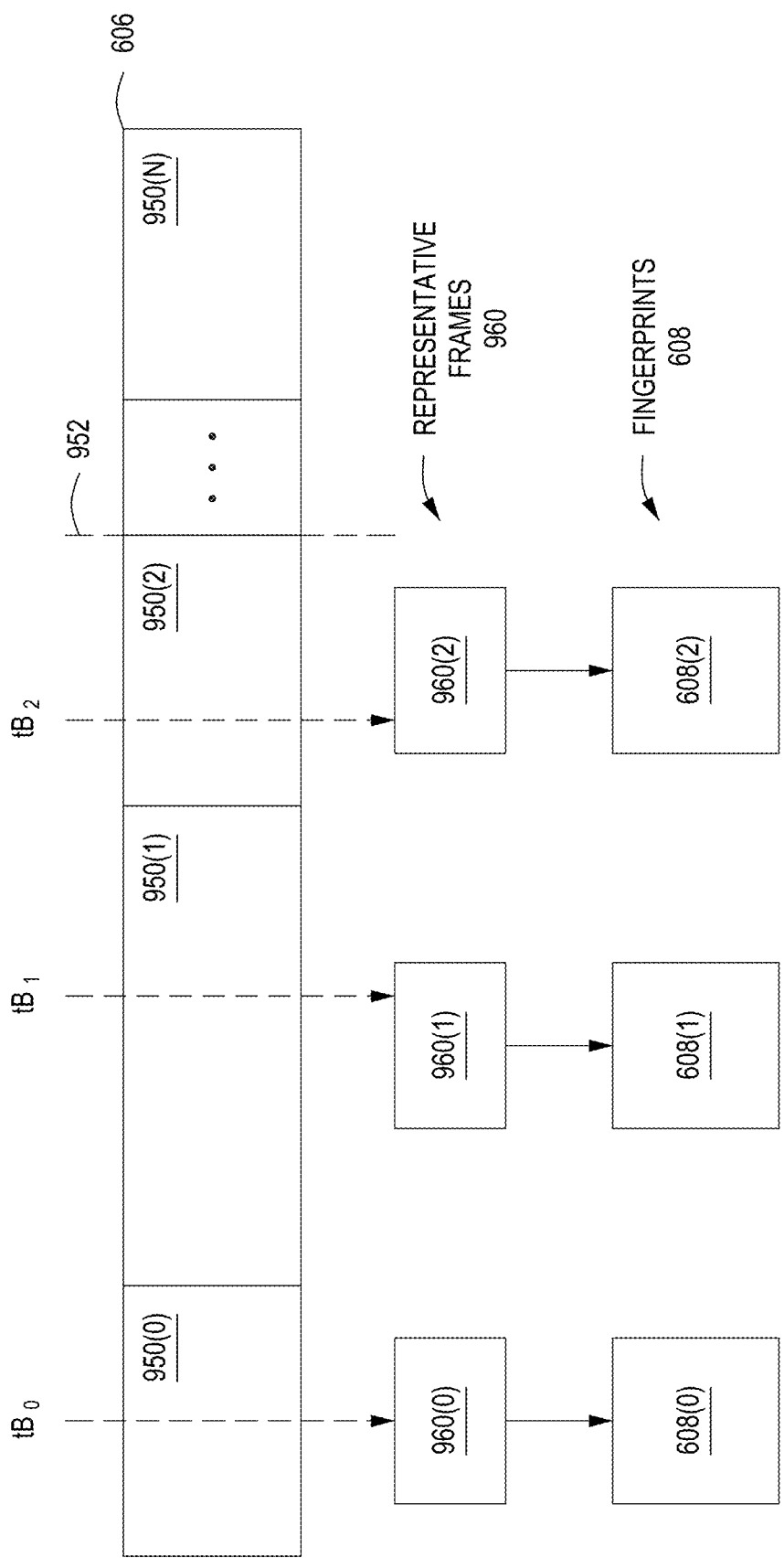

FIGS. 9A-9B illustrate how the fingerprint generator 600 of FIG. 6 generates exemplary fingerprints based on shot sequences, according to various embodiments of the present invention.

As shown in FIG. 9A, a previous episode 602 includes shot sequences 900(0), 900(1), 900(2), and 900(3). Each shot sequence 900 includes frames of video generated from a single point of capture and therefore associated with a particular cinematic "shot." The single point of capture could be, for example, a physical video camera. Alternatively, the single point of capture could be a virtual camera used in the context of computer animation.

For each shot sequence 900, fingerprint generator 600 selects a single representative frame 910. As is shown, fingerprint generator 600 selects representative frame 910(0) having time index $TA_0$, representative frame 910(1) having time index $TA_1$, representative frame 910(2) having time index $TA_2$, and representative frame 910(3) having time index $TA_3$.

Conceptually, each representative frame 910 is a canonical example of a frame that may be found within the corresponding shot sequence 900, and therefore characterizes that shot sequence 900. Fingerprint generator 600 selects each representative frame 900 to have greater complexity and/or entropy compared to other frames in the same shot sequence 900. Accordingly, representative frames 910 are likely to include text superimposed over regular imagery, including, for example, credits associated with an introductory sequence. Persons skilled in the art will understand that many techniques exist in the realm of image and video processing for determining complexity and/or entropy of a given image or video frame.

Based on representative frames 910, fingerprint generator 600 generates fingerprints 604. Fingerprint generator 600 generates fingerprint 604(0) based on representative frame 900(0), fingerprint 604(1) based on representative frame 900(1), fingerprint 604(2) based on representative frame 900(2), generates fingerprint 604(3) based on representative frame 900(3). A given fingerprint 604 includes data that may be used to uniquely identify that fingerprint and, in turn, the associated representative frame 910 and corresponding shot sequence 900. As discussed, this data can then be used to identify shot sequences that have been played back to the user already, such as credit sequences, for example.

In some instances, however, the specific text included in a particular credit sequence may vary across otherwise similar credit sequences. Suppose, for example, that previous episode 602 is directed by a first director, while current episode 606 is directed by a second director. To avoid generating different fingerprints for these two essentially similar credit sequences, in one embodiment, fingerprint generator 600 removes any text from representative frames 910 prior to generating fingerprints 604.

Fingerprint generator 600 may perform the above techniques for each different previous episode 602, although only one such pervious episode is discussed in this example for clarity. Fingerprint generator 600 also generates fingerprints 608 based on current episode 606 using a similar technique as described above. This technique is described in greater detail below in conjunction with FIG. 9B.

As shown in FIG. 9B, current episode 606 includes shot sequences 950(0), 950(1), and 950(2) through 950(N). Fingerprint generator 600 is configured to process a subset of shot sequences 950 that occur before a boundary 952. Boundary 952 may separate, for example, the first 30% of current episode 606 from the remaining 70% of current episode. Generally, boundary 952 may be placed according to where repeated content is likely to occur in current episode 606 (generally, towards the beginning).

Fingerprint generator 600 selects representative frames 960(0), 960(1), and 960(2) at times $tB_0$, $tB_1$, and $tB_2$, respectively, based on shot sequences 950(0), 950(1), and 950(2), respectively. Fingerprint generator 600 uses a similar frame selection technique as the one described above in conjunction with FIG. 9A. Fingerprint generator 600 then generates fingerprints 608 based on representative frames 960 using a similar fingerprint generation technique as that described above in conjunction with FIG. 9A. A given fingerprint includes different subsets of fingerprint data that can be used to uniquely identify the fingerprint, as described in greater detail below in conjunction with FIG. 10.

Figure 10:
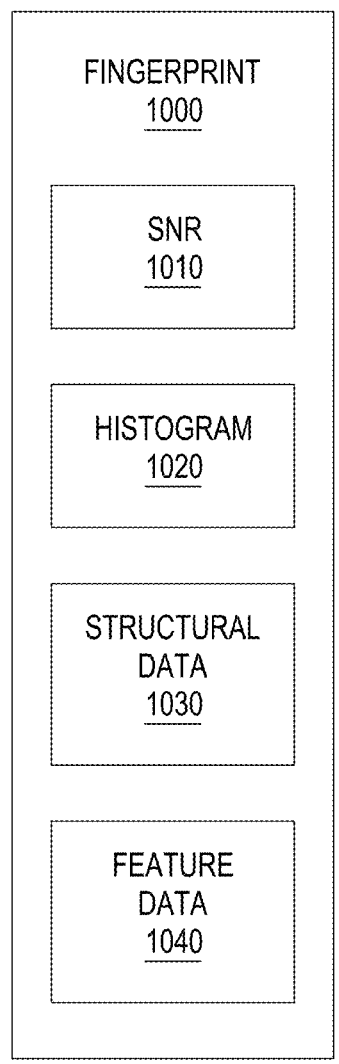
FIG. 10 illustrates an exemplary fingerprint associated with a shot sequence, according to various embodiments of the present invention.

FIG. 10 illustrates an exemplary fingerprint 1000 associated with a shot sequence, according to various embodiments of the present invention. Fingerprint 1000 may be any of fingerprints 604 and 608 shown in FIGS. 9A-9B, respectively. Fingerprint 1000 includes signal-to-noise ratio (SNR) 1010, histogram 1020, structural data 1030, and feature data 1040.

SNR 1010 may be computed using techniques well known in the art. Histogram 1020 is a statistical measure of pixel values within the associated representative frame. Histogram 1020 could include, for example, a multitude of bins corresponding to ranges of pixel values. A given bin would indicate the number of pixels in the associated representative frame having a color value falling within the range of values associated with the bin. Structural data 1030 may indicate structural features of the associated representative frame, including, for example, regions of the frame having specific geometries and color values. Feature data 1040 may include a mapping of detected features to locations in the frame. Computer vision techniques may be applied to generate feature data 1040. The particular subsets of fingerprint data shown are provided for exemplary purposes only. Fingerprint 1000 may also include other subsets of fingerprint data generated based on a representative frame.

As a general matter, fingerprint 1000 characterizes the associated representative frame and may be used to distinguish that representative frame from other representative frames. Conversely, the various data shown may also be used to determine whether two representative frames are similar or the same. For example, two fingerprints having different SNR values likely do not correspond to the same representative frame, although two fingerprints having similar SNR values may correspond to similar representative frames. Based on fingerprint comparisons, fingerprint comparator 610 identifies repeated content that can be skipped.

Generally, two portions of data, such as fingerprints, may be considered "similar" or "substantially similar" when those two portions share at least a threshold amount of data with one another. For example, two fingerprints could be considered "similar" when those two fingerprints have SNR values within a threshold difference of one another. Alternatively, two fingerprints could be considered "similar" when those two fingerprints include at least a threshold number of common features. In addition, two or more frames and/or shot sequences may be considered "substantially similar" when those frames and/or shot sequences have similar fingerprints.

Once fingerprint generator 600 generates fingerprints 604 and 608 using the above technique, fingerprint comparator 610 then compares fingerprints 604 to fingerprints 608 to determine if any representative frames included in any previous episodes 602 also occur in current episode 606. Portions of current episode 606 associated with those frames may then be skipped, as mentioned. The comparison technique performed by fingerprint comparator 610 is described in greater detail below in conjunction with FIG. 11.

Exemplary Comparison of Fingerprints

Figure 11:
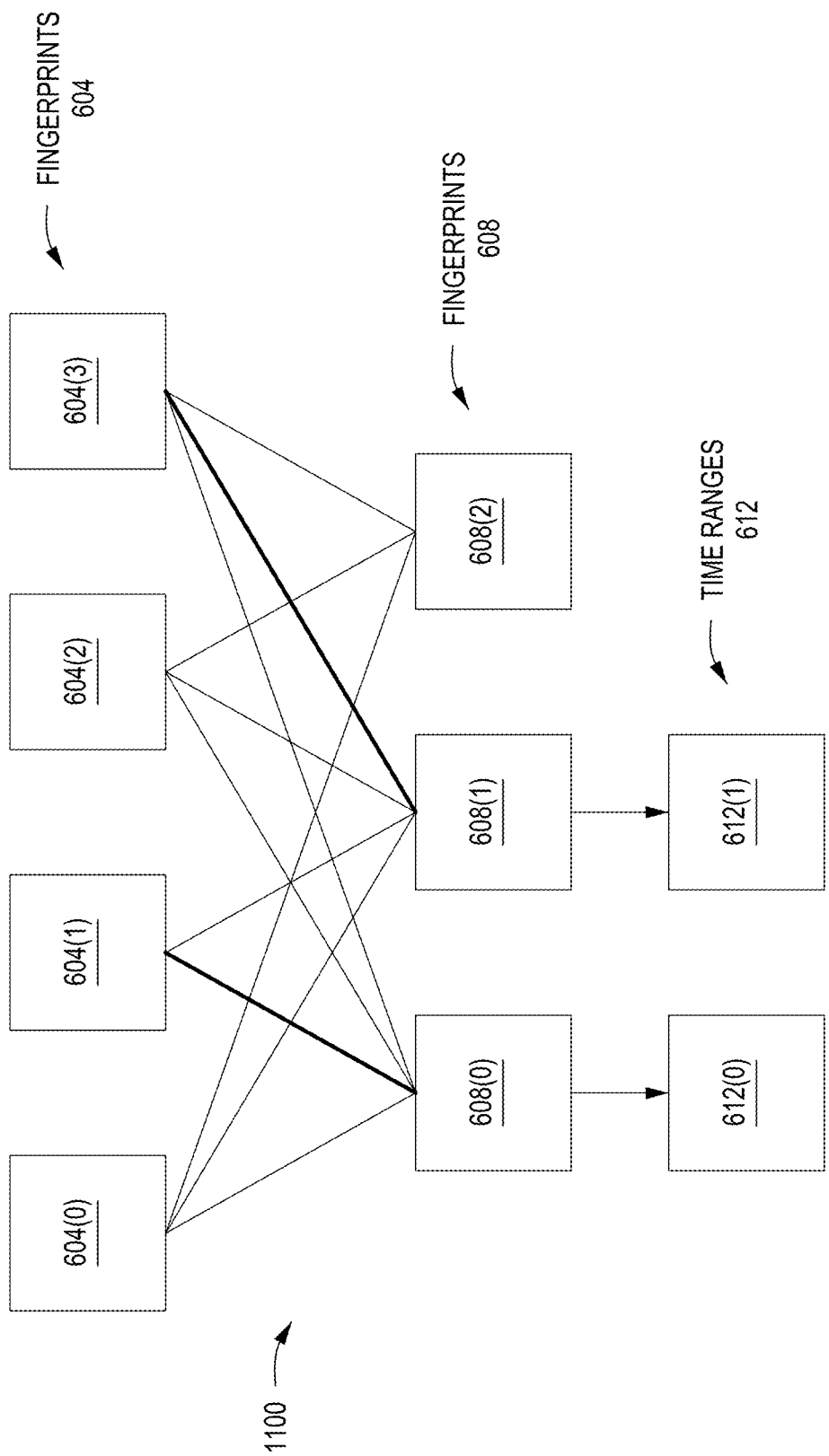
FIG. 11 illustrates how the sequence comparator of FIG. 6 generates time ranges associated with previously streamed content, according to various embodiments of the present invention.

FIG. 11 illustrates how the fingerprint comparator 610 of FIG. 6 generates time ranges 612 associated with previously played content, according to various embodiments of the present invention. As shown, fingerprint comparator 610 performs a plurality of comparison operations 100 in order to compare each one of fingerprints 604(0) through 604(3) to each one of fingerprints 608(0) through 608(2). For each such comparison operation, fingerprint comparator 610 determines whether the two fingerprints have above a threshold level of similarity.

Fingerprint comparator 610 computes similarity between any two fingerprints 604 and 608 by comparing corresponding data included in each such fingerprint. That data may include, for example, SNR data, histogram data, and other data described in conjunction with FIG. 10. Fingerprint comparator 610 need not compare all such data to determine whether two fingerprints 604 and 608 are different. For example, fingerprint comparator 610 could first compare SNR data between the two fingerprints. If the threshold SNR similarity data does not exceed the threshold, fingerprint comparator 610 determines that the two fingerprints 604 and 608 are different, and need not compare any remaining data.

However, if the similarity between SNR values exceeds a threshold SNR similarity value, then fingerprint comparator 610 would proceed to comparing additional data. To establish similarity between two fingerprints, fingerprint comparator 610 generally compares each different subset of fingerprint data in order of complexity. In the exemplary fingerprint shown in FIG. 10, SNR data 1010 is the least complex subset of fingerprint data, while feature data 1040 is the most complex subset of fingerprint data. Fingerprint comparator 610 may thus conserve processing resources by only performing complex comparisons of complex data as needed.

Upon performing comparisons 1100, fingerprint comparator 610 identifies specific fingerprints included in fingerprints 604 and 608 that have at least a threshold level of similarity. Fingerprint comparator 610 then generates time ranges 612 indicating times in current episode 606 when the corresponding shot sequences occur. For example, fingerprint comparator 610 could determine that fingerprints 604(1) and 608(0) are similar, and then generate time range 612(0). Fingerprint 604(1) could correspond to shot sequences include in an introductory section of previous episode 602. Fingerprint comparator 610 could also determine that fingerprint 608(1) and fingerprints 604(3) and 608(1) are similar, and then generate time range 612(1). Fingerprint 604(3) could correspond to a frame of previous episode 602 subsequently included into a recap section of current episode 606. Based on time ranges 612, playback interface 700 of FIGS. 7-8 displays skip button 812 to the user, thereby allowing the user to skip this repeated content. The techniques described thus far are also described in stepwise fashion below in conjunction with FIG. 12.

Procedure for Skipping Repeated Playback of
Video Sequences

Figure 12:
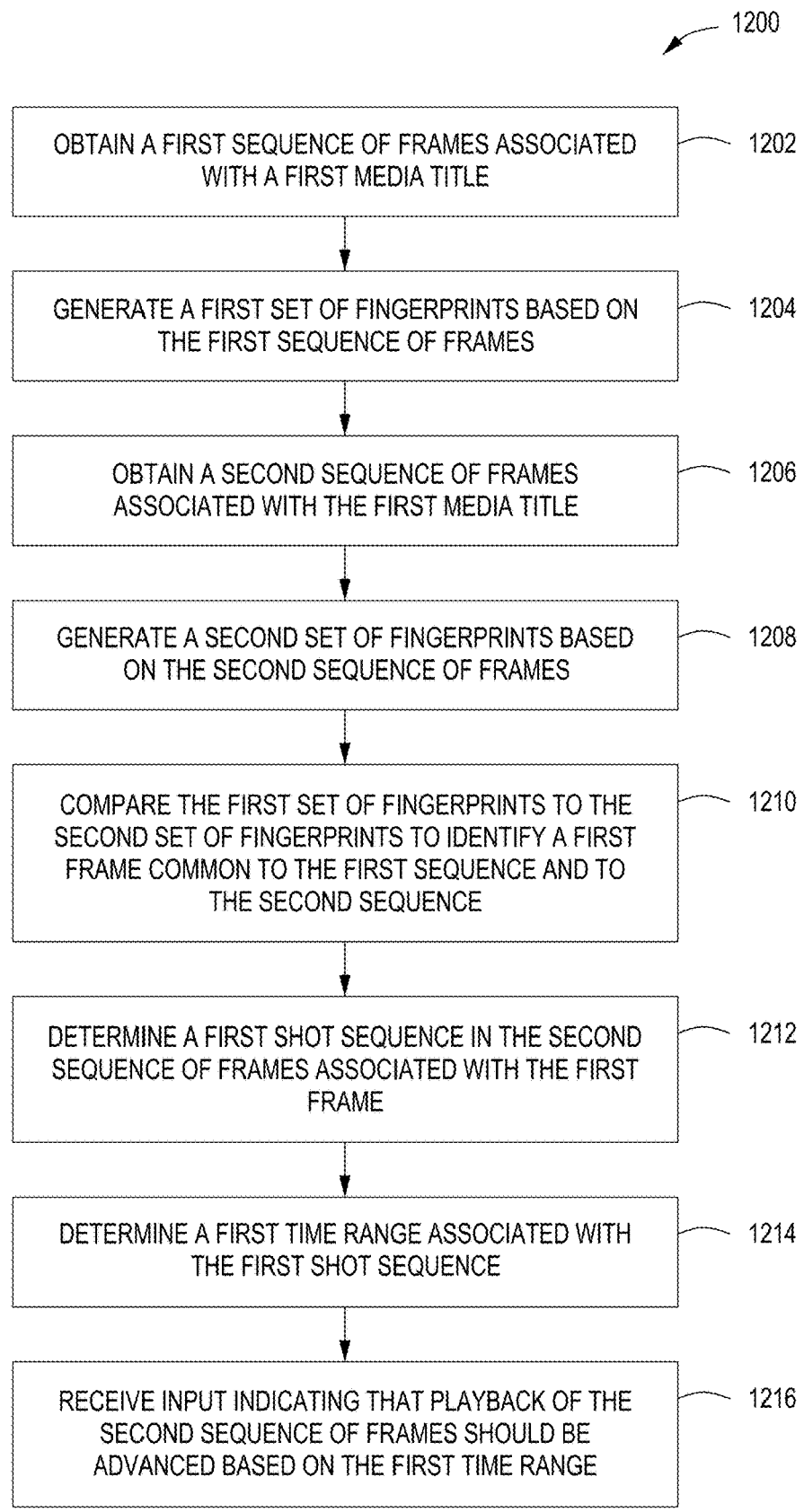
FIG. 12 is a flow diagram of method steps for identifying and skipping a previously streamed portion of a media title, according to various embodiments of the present invention.

FIG. 12 is a flow diagram of method steps for identifying and skipping a previously streamed portion of a media title, according to various embodiments of the present invention. Although the method steps are described with respect to the systems of FIGS. 1-11, persons skilled in the art will understand that any system configured to perform the method steps, in any order, falls within the scope of the present disclosure.

As shown, a method 1200 begins at step 1202, where sequence analyzer 508 obtains a first sequence of frames associated with a first media title. The first sequence of frames could be, for example, previous episode 602 of FIG. 6. At step 1204, sequence analyzer 508 generates a first set of fingerprints based on the first sequence of frames. For example, sequence analyzer 508 could generate fingerprints 604 based on previous episode 602, as discussed above in conjunction with in FIG. 6.

At step 1206, sequence analyzer 508 obtains a second sequence of frames associated with the first media title. The second sequence of frames could be, for example, current episode 606 of FIG. 6. At step 1208, sequence analyzer 508 generates a second set of fingerprints based on the second sequence of frames. For example, sequence analyzer 508 could generate fingerprints 606 based on current episode 606, as discussed above in conjunction with in FIG. 6.

At step 1210, sequence analyzer 508 compares the first set of fingerprints to the second set of fingerprints to identify a first frame common to the first sequence and to the second sequence. In doing so, sequence analyzer 508 may compare different data included in those fingerprints in a sequential manner, in increasing order of complexity. At step 1212, sequence analyzer 508 determines a first shot sequence in the second sequence of frames associated with the first frame. The first shot sequence could be included in an introductory section common across the first and second sequences, among other possibilities.

At step 1214, sequence analyzer 508 determines a first time range associated with the first shot sequence. The time range determined at step 1214 is one of times ranges 612 of FIGS. 6-9B and 11. Playback interface 700 of FIGS. 7-8 displays the first time range to enable content skipping. At step 1216, playback application 436 receives input (via playback interface 700) indicating that playback of the second sequence of frames should be advanced based on the first time range. Playback application 436 700 may then advance playback of the second sequence of frames past the repeated content.

In sum, a sequence analyzer compares different episodes of an episodic serial to identify portions of a current episode of the serial that have already been played back to a user. Those portions may include introductory material such as credits, or a recap section that includes content from previous episodes. The sequence analyzer parses previous episodes of the serial and selects a representative frame for each shot sequence. The sequence analyzer then generates a fingerprint for each shot sequence based on the associated representative frame. The sequence analyzer compares fingerprints associated with a current episode of the serial to fingerprints associated with one or more previous episodes of the serial to identify shot sequences that have already been played. The user may then skip those repeated sequences via a playback interface.

At least one advantage of the disclosed techniques is that users are not required to re-watch portions of episodic serials. Instead, the sequence analyzer determines the specific portions of those serials that have already been played to the user, and allows the user to skip those portions. Accordingly, the user may be more engaged with the episodic serial and with the video streaming service in general, leading to greater customer satisfaction.

1. In some embodiments, a computer-implemented method comprises: generating a first set of fingerprints based on a first video sequence, wherein each fingerprint included in the first set of fingerprints identifies a different portion of the first video sequence, generating a second set of fingerprints based on a second video sequence, wherein each fingerprint included in the second set of fingerprints identifies a different portion of the second video sequence, comparing the first set of fingerprints to the second set of fingerprints to determine that a first portion of the first video sequence is substantially similar to a second portion of the second video sequence, and when playing back the second video sequence, causing the second video sequence to advance past the second portion.

2. The computer-implemented method of clause 1, wherein generating a specific set of fingerprints based on a specific video sequence comprises: determining a plurality of portions included in the specific video sequence, selecting a separate representative frame from each portion included in the plurality of portions, and generating a separate fingerprint for each separate representative frame.

3. The computer-implemented method of any of clauses 1 and 2, wherein generating a particular fingerprint for a particular representative frame comprises generating one or more subsets of fingerprint data, wherein each subset of fingerprint data comprises a signal-to-noise ratio associated with the particular representative frame, a histogram corresponding to the particular representative frame, structural data defining at least one structural attribute of the particular representative frame, or feature data indicating at least one feature of the particular representative frame.

4. The computer-implemented method of any of clauses 1, 2, and 3, wherein comparing the first set of fingerprints to the second set of fingerprints comprises comparing each fingerprint included in the first set of fingerprints to each fingerprint included in the second set of fingerprints to determine that a first fingerprint included in the first set of fingerprints is substantially similar to a second fingerprint included in the second set of fingerprints.

5. The computer-implemented method of any of clauses 1, 2, 3, and 4, wherein the first fingerprint is generated from the first portion of the first video sequence, and the second fingerprint is generated from the second portion of the second video sequence.

6. The computer-implemented method of any of clauses 1, 2, 3, 4, and 5, wherein the first fingerprint is determined to be substantially similar to the second fingerprint by: determining that a first subset of data included in the first fingerprint is substantially similar to a second subset of data included in the second fingerprint, and determining that a third subset of data included in the first fingerprint is substantially similar to a fourth subset of data included in the second fingerprint.

7. The computer-implemented method of any of clauses 1, 2, 3, 4, 5, and 6, wherein the first portion of the video sequence includes a first sequence of frames captured continuously from a first point of capture, wherein the first point of capture comprises a physical video camera or a virtual video camera.

8. The computer-implemented method of any of clauses 1, 2, 3, 4, 5, 6, and 7, wherein causing the second video sequence to advance past the second portion of the second video sequence comprises generating a first time range corresponding to the second portion of the second video sequence, and advancing the second video sequence past the first time range in response to a selection received via a playback interface.

9. The computer-implemented method of any of clauses 1, 2, 3, 4, 5, 6, 7, and 8, further comprising displaying a first interface element within the playback interface via which the selection is received only when a playback position of the second video sequence falls within the first time range.

10. In some embodiments, a non-transitory computer-readable medium stores program instructions that, when executed by a processor, configures the processor to perform the steps of: generating a first set of fingerprints based on a first video sequence, wherein each fingerprint included in the first set of fingerprints identifies a different portion of the first video sequence, generating a second set of fingerprints based on a second video sequence, wherein each fingerprint included in the second set of fingerprints identifies a different portion of the second video sequence, comparing the first set of fingerprints to the second set of fingerprints to determine that a first portion of the first video sequence is substantially similar to a second portion of the second video sequence, when playing back the second video sequence, causing the second video sequence to advance past the second portion.

11. The non-transitory computer-readable medium of clause 10, wherein the step of generating a specific set of fingerprints based on a specific video sequence comprises: determining a plurality of portions included in the specific video sequence, selecting a separate representative frame from each portion included in the plurality of portions, and generating a separate fingerprint for each separate representative frame.

12. The non-transitory computer-readable medium of any of clauses 10 and 11, wherein generating a particular fingerprint for a particular representative frame comprises generating one or more subsets of fingerprint data, wherein each subset of fingerprint data comprises a signal-to-noise ratio associated with the particular representative frame, a histogram corresponding to the particular representative frame, structural data defining at least one structural attribute of the particular representative frame, or feature data indicating at least one feature of the particular representative frame.

13. The non-transitory computer-readable medium of any of clauses 10, 11, and 12, wherein comparing the first set of fingerprints to the second set of fingerprints comprises comparing each fingerprint included in the first set of fingerprints to each fingerprint included in the second set of fingerprints to determine that a first fingerprint included in the first set of fingerprints is substantially similar to a second fingerprint included in the second set of fingerprints.

14. The non-transitory computer-readable medium of any of clauses 10, 11, 12, and 13, wherein the first fingerprint is generated from the first portion of the first video sequence, and the second fingerprint is generated from the second portion of the second video sequence.

15. The non-transitory computer-readable medium of any of clauses 10, 11, 12, 13, and 14, wherein the first fingerprint is determined to be substantially similar to the second fingerprint by: determining that a first subset of data included in the first fingerprint is substantially similar to a second subset of data included in the second fingerprint, and determining that a third subset of data included in the first fingerprint is substantially similar to a fourth subset of data included in the second fingerprint.

16. The non-transitory computer-readable medium of any of clauses 10, 11, 12, 13, 14, and 15, wherein both the first portion of the first video sequence and the second portion of the second video sequence comprise an introductory sequence that includes one or more production credits.

17. The non-transitory computer-readable medium of any of clauses 10, 11, 12, 13, 14, 15, and 16, wherein the second portion of the second video sequence comprises a recap sequence that includes one or more frames of video data also included in the first portion of the first video sequence.

18. The non-transitory computer-readable medium of any of clauses 10, 11, 12, 13, 14, 15, 16, and 17, further comprising the steps of: determining a category associated with the second portion of the second video sequence, and causing a playback interface to display an interface element indicating the category.

19. In some embodiments, a system comprises: a memory storing an application, and a processor that executes the application to perform the steps of: generating a first set of fingerprints based on a first video sequence, wherein each fingerprint included in the first set of fingerprints identifies a different portion of the first video sequence, generating a second set of fingerprints based on a second video sequence, wherein each fingerprint included in the second set of fingerprints identifies a different portion of the second video sequence, comparing the first set of fingerprints to the second set of fingerprints to determine that a first portion of the first video sequence is substantially similar to a second portion of the second video sequence, and when playing back the second video sequence, causing the second video sequence to advance past the second portion.

20. The system of clause 19, wherein both the first portion of the first video sequence and the second portion of the second video sequence comprise an introductory sequence that includes one or more production credits.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   generating a first set of fingerprints based on a first video sequence by, for each portion of the first video sequence:
      comparing content associated with two or more frames in the portion to identify a representative frame in the portion, and
      generating, based on the representative frame, a different fingerprint that identifies the portion of the first video sequence;
   generating a second set of fingerprints based on a second video sequence, wherein each fingerprint included in the second set of fingerprints identifies a different portion of the second video sequence;
   comparing the first set of fingerprints to the second set of fingerprints to determine that a first portion of the first video sequence is substantially similar to a second portion of the second video sequence; and
   when playing back the second video sequence, causing the second video sequence to advance past the second portion.

2. The computer-implemented method of claim 1, wherein generating the second set of fingerprints based on the second video sequence comprises:
   determining a plurality of portions included in the second video sequence;
   selecting a separate representative frame from each portion included in the plurality of portions; and
   generating a separate fingerprint for each separate representative frame.

3. The computer-implemented method of claim 2, wherein generating a particular fingerprint for a particular representative frame comprises generating one or more subsets of fingerprint data, wherein each subset of fingerprint data comprises a signal-to-noise ratio associated with the particular representative frame, a histogram corresponding to the particular representative frame, structural data defining at least one structural attribute of the particular representative frame, or feature data indicating at least one feature of the particular representative frame.

4. The computer-implemented method of claim 1, wherein comparing the first set of fingerprints to the second set of fingerprints comprises comparing each fingerprint included in the first set of fingerprints to each fingerprint included in the second set of fingerprints to determine that a first fingerprint included in the first set of fingerprints is substantially similar to a second fingerprint included in the second set of fingerprints.

5. The computer-implemented method of claim 4, wherein the first fingerprint is generated from the first portion of the first video sequence, and the second fingerprint is generated from the second portion of the second video sequence.

6. The computer-implemented method of claim 4, wherein the first fingerprint is determined to be substantially similar to the second fingerprint by:
   determining that a first subset of data included in the first fingerprint is substantially similar to a second subset of data included in the second fingerprint; and
   determining that a third subset of data included in the first fingerprint is substantially similar to a fourth subset of data included in the second fingerprint.

7. The computer-implemented method of claim 1, wherein the first portion of the video sequence includes a first sequence of frames captured continuously from a first point of capture, wherein the first point of capture comprises a physical video camera or a virtual video camera.

8. The computer-implemented method of claim 1, wherein causing the second video sequence to advance past the second portion of the second video sequence comprises generating a first time range corresponding to the second portion of the second video sequence, and advancing the second video sequence past the first time range in response to a selection received via a playback interface.

9. The computer-implemented method of claim 8, further comprising displaying a first interface element within the playback interface via which the selection is received only when a playback position of the second video sequence falls within the first time range.

10. A non-transitory computer-readable medium storing program instructions that, when executed by a processor, configures the processor to perform the steps of:
  generating a first set of fingerprints based on a first video sequence by, for each portion of the first video sequence:
    comparing content associated with two or more frames in the portion to identify a representative frame in the portion, and
    generating, based on the representative frame, a different fingerprint that identifies the portion of the first video sequence;
  generating a second set of fingerprints based on a second video sequence, wherein each fingerprint included in the second set of fingerprints identifies a different portion of the second video sequence;
  comparing the first set of fingerprints to the second set of fingerprints to determine that a first portion of the first video sequence is substantially similar to a second portion of the second video sequence; and
  when playing back the second video sequence, causing the second video sequence to advance past the second portion.

11. The non-transitory computer-readable medium of claim 10, wherein the step of generating the second set of fingerprints based on the second video sequence comprises:
  determining a plurality of portions included in the second video sequence;
  selecting a separate representative frame from each portion included in the plurality of portions; and
  generating a separate fingerprint for each separate representative frame.

12. The non-transitory computer-readable medium of claim 11, wherein generating a particular fingerprint for a particular representative frame comprises generating one or more subsets of fingerprint data, wherein each subset of fingerprint data comprises a signal-to-noise ratio associated with the particular representative frame, a histogram corresponding to the particular representative frame, structural data defining at least one structural attribute of the particular representative frame, or feature data indicating at least one feature of the particular representative frame.

13. The non-transitory computer-readable medium of claim 10, wherein comparing the first set of fingerprints to the second set of fingerprints comprises comparing each fingerprint included in the first set of fingerprints to each fingerprint included in the second set of fingerprints to determine that a first fingerprint included in the first set of fingerprints is substantially similar to a second fingerprint included in the second set of fingerprints.

14. The non-transitory computer-readable medium of claim 13, wherein the first fingerprint is generated from the first portion of the first video sequence, and the second fingerprint is generated from the second portion of the second video sequence.

15. The non-transitory computer-readable medium of claim 13, wherein the first fingerprint is determined to be substantially similar to the second fingerprint by:
  determining that a first subset of data included in the first fingerprint is substantially similar to a second subset of data included in the second fingerprint; and
  determining that a third subset of data included in the first fingerprint is substantially similar to a fourth subset of data included in the second fingerprint.

16. The non-transitory computer-readable medium of claim 10, wherein both the first portion of the first video sequence and the second portion of the second video sequence comprise an introductory sequence that includes one or more production credits.

17. The non-transitory computer-readable medium of claim 10, wherein the second portion of the second video sequence comprises a recap sequence that includes one or more frames of video data also included in the first portion of the first video sequence.

18. The non-transitory computer-readable medium of claim 10, further comprising the steps of:
  determining a category associated with the second portion of the second video sequence; and
  causing a playback interface to display an interface element indicating the category.

19. A system, comprising:
  a memory storing an application; and
  a processor that executes the application to perform the steps of:
    generating a first set of fingerprints based on a first video sequence by, for each portion of the first video sequence:
      comparing content associated with two or more frames in the portion to identify a representative frame in the portion, and
      generating, based on the representative frame, a different fingerprint that identifies the portion of the first video sequence;
    generating a second set of fingerprints based on a second video sequence, wherein each fingerprint included in the second set of fingerprints identifies a different portion of the second video sequence,
    comparing the first set of fingerprints to the second set of fingerprints to determine that a first portion of the first video sequence is substantially similar to a second portion of the second video sequence, and
    when playing back the second video sequence, causing the second video sequence to advance past the second portion.

20. The system of claim 19, wherein both the first portion of the first video sequence and the second portion of the second video sequence comprise an introductory sequence that includes one or more production credits.

* * * * *